US00RE46786E

(19) United States
(12) Reissued Patent
Clough et al.

(10) Patent Number: US RE46,786 E
(45) Date of Reissued Patent: Apr. 17, 2018

(54) EXFOLIATING DEVICE WITH COVER, AND ROLLER THEREFOR

(71) Applicant: Reckitt Benckiser (Brands) Limited, Berkshire (GB)

(72) Inventors: Richard Clough, Warwick (GB); Darren Morgan, Berkshire (GB); Mohammed Chopdat, Hull (GB); Michael Liang, Dongguan (CN); Victoria Perrin, Hull (GB)

(73) Assignee: Reckitt Benckiser (Brands) Limited, Slough (GB)

(21) Appl. No.: 29/513,660

(22) Filed: Jan. 5, 2015

Related U.S. Patent Documents

Reissue of:
(64) Patent No.: Des. 706,982
Issued: Jun. 10, 2014
Appl. No.: 29/461,268
Filed: Jul. 19, 2013

(30) Foreign Application Priority Data

Jan. 23, 2013 (EM) ..... 002171074-0002

(51) LOC (11) Cl. ..... 28-03
(52) U.S. Cl.
USPC ..... D28/44.1
(58) Field of Classification Search
USPC ..... D28/57–59, 44–44.1; D24/146, 133; D11/1; D21/487, 362, 662, 694, 681, D21/682, 684; D25/126
(Continued)

(56) References Cited

U.S. PATENT DOCUMENTS 616,746 A 12/1898 Taylor
920,432 A 5/1909 Coffin
(Continued)

FOREIGN PATENT DOCUMENTS

DE 29710333 U1 9/1997
EM 000926845-0001 6/2008
EM 002540989-0009 10/2014

OTHER PUBLICATIONS

Panasonic Japan Keratin Remover Peeling ES-WE20, listed on Amazon website on Jan. 5, 2014 at (http://www.amazon.com/Panasonic-Keratin-Remover-Peeling-ES-WE20/dp/B003AM7C8S/ref=sr_1_15?)ie=UTF8&qid=1420469797&sr=8-15&keywords=panasonic+ES-WE20), believed available on Amazon in Japan in Mar. 2010.
(Continued)

*Primary Examiner* — Philip S Hyder
(74) *Attorney, Agent, or Firm* — Troutman Sanders LLP; Ryan Schneider; Chris Davis

(57) CLAIM

The ornamental design for [a depilatory] *an exfoliating* device with cover, *and roller therefor,* as shown and described.

DESCRIPTION

FIG. 1 is a front perspective view of [a depilatory device with cover] *an exfoliating device with cover, and roller therefor,* according to the present invention;
FIG. 2 is a front view of the [depilatory] *exfoliating* device with cover of FIG. 1;
FIG. 3 is a back view of the [depilatory] *exfoliating* device with cover of FIG. 1;
FIG. 4 is a side view of the [depilatory] *exfoliating* device with cover of FIG. 1;
FIG. 5 is the other side view of the [depilatory] *exfoliating* device with cover of FIG. 1;
FIG. 6 is a top view of the [depilatory] *exfoliating* device with cover of FIG. 1; [and,]
FIG. 7 is a bottom view of the [depilatory] *exfoliating* device with cover of FIG. 1[.];
*FIG. 8 is a front perspective view of the roller portion of the exfoliating device with cover, and roller therefor, of FIG. 1;*
(Continued)

*FIG. 9 is a front view of the roller of FIG. 8;*
*FIG. 10 is a back view of the roller of FIG. 8;*
*FIG. 11 is a side view of the roller of FIG. 8;*
*FIG. 12 is the other side view of the roller of FIG. 8;*
*FIG. 13 is a top view of the roller of FIG. 8; and,*
*FIG. 14 is a bottom view of the roller of FIG. 8.*
*The broken line showing the exfoliating device is for environmental purposes only and is not considered part of the claimed design.*

1 Claim, 6 Drawing Sheets

Figure 1:
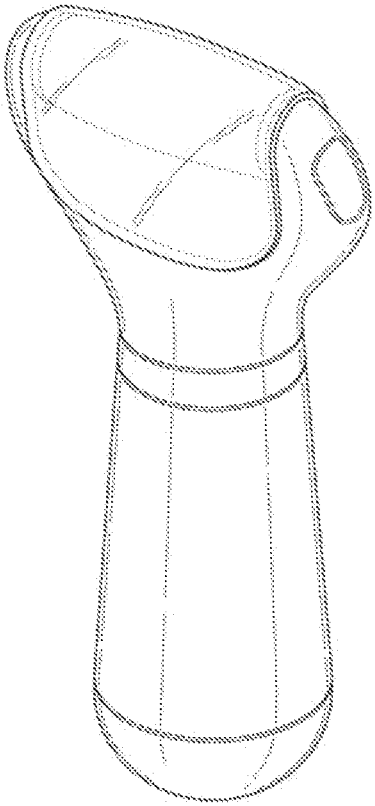
Figure 2:
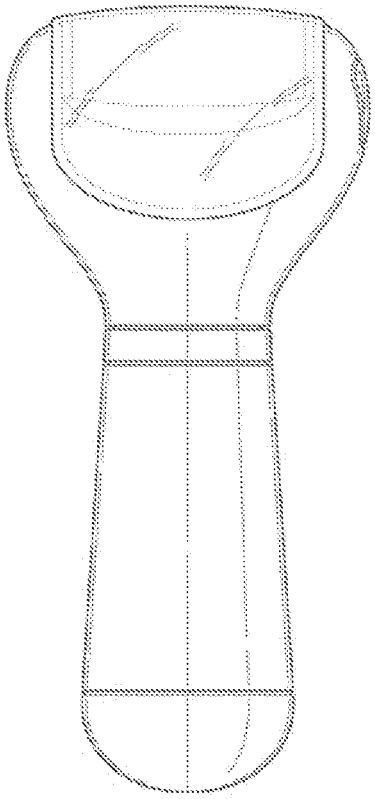
Figure 3:
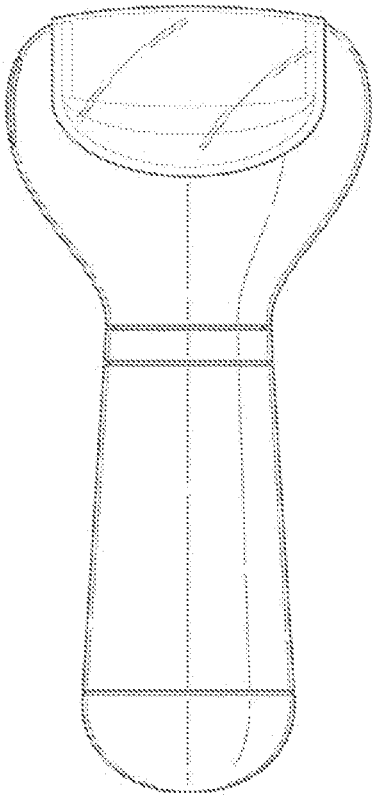
Figure 4:
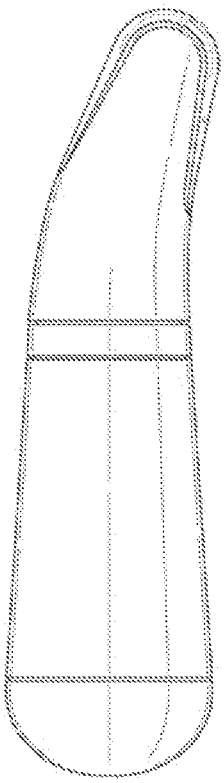
Figure 5:
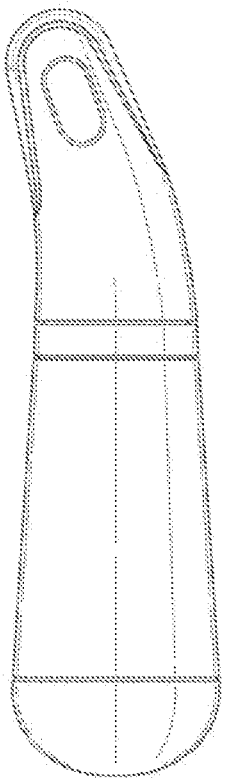
Figure 6:
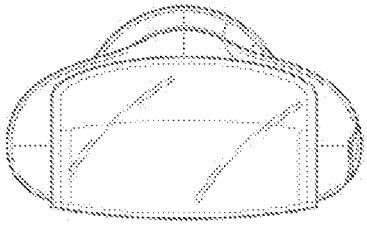
Figure 7:
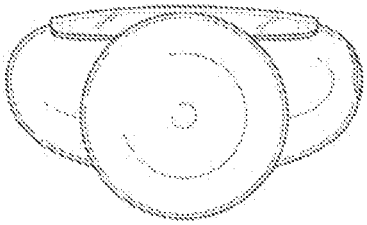

Matter enclosed in heavy brackets [ ] appears in the original patent but forms no part of this reissue; matter printed in italics indicates the additions made by reissue.

(58) Field of Classification Search
CPC ..... A61B 17/54; A61B 2017/00398; A61B 2017/00889
See application file for complete search history.

(56) References Cited

U.S. PATENT DOCUMENTS

| | | | | |
|---|---|---|---|---|
| 2,508,812 | A | 5/1950 | Burger | |
| 2,867,214 | A | 1/1959 | Wilson | |
| D234,156 | S | 1/1975 | Lane | |
| D269,641 | S * | 7/1983 | Mann | D28/51 |
| D290,527 | S * | 6/1987 | Thorogood | D28/10 |
| 4,773,784 | A * | 9/1988 | Mann | 401/1 |
| D300,958 | S * | 5/1989 | Moore | D28/7 |
| 5,491,526 | A | 2/1996 | Shimizu | |
| D395,564 | S | 6/1998 | Grosfillex | |
| D397,509 | S * | 8/1998 | Shvadron | D28/10 |
| 5,803,636 | A * | 9/1998 | Legrain et al. | 401/1 |
| D401,717 | S * | 11/1998 | Grueber et al. | D34/29 |
| D412,598 | S * | 8/1999 | Gudefin | D28/44.1 |
| D414,875 | S | 10/1999 | Sirois et al. | |
| 6,039,482 | A * | 3/2000 | Smal | 401/1 |
| D423,178 | S * | 4/2000 | Specht | D34/29 |
| 6,170,648 | B1 | 1/2001 | Coxon et al. | |
| 6,227,711 | B1 | 5/2001 | Kellström et al. | |
| 6,310,278 | B1 | 10/2001 | Butler | |
| 6,409,010 | B1 | 6/2002 | Leon | |
| 6,595,450 | B2 | 7/2003 | Asano et al. | |
| 6,630,058 | B2 | 10/2003 | Muraoka | |
| 7,060,119 | B1 | 6/2006 | Haider | |
| D541,473 | S * | 4/2007 | Lamason et al. | D28/44.1 |
| 7,644,589 | B2 * | 1/2010 | Habatjou | 62/60 |
| D654,220 | S * | 2/2012 | Cole | D28/45 |
| 8,226,662 | B2 * | 7/2012 | Song | 606/131 |
| D681,277 | S * | 4/2013 | Yiu | D28/59 |
| D683,067 | S | 5/2013 | Wanders | |
| D686,370 | S * | 7/2013 | Yiu | D28/59 |
| D688,338 | S | 8/2013 | Bisson | |
| D692,181 | S * | 10/2013 | Yiu | D28/53 |
| 8,616,544 | B2 | 12/2013 | Katayama et al. | |
| D718,182 | S | 11/2014 | Woltz | |
| 2002/0107527 | A1 | 8/2002 | Burres | |
| 2003/0002912 | A1 * | 1/2003 | Morpeth | 401/208 |
| 2004/0254587 | A1 | 12/2004 | Park | |
| 2007/0143968 | A1 | 6/2007 | Tseng | |
| 2008/0092338 | A1 | 4/2008 | Wu | |
| 2009/0209977 | A1 * | 8/2009 | Rogatschnig | 606/133 |
| 2010/0239356 | A1 * | 9/2010 | Caulier | 401/157 |
| 2012/0226289 | A1 | 9/2012 | Yiu | |

OTHER PUBLICATIONS

Refill Roller for Panasonic Japan Keratin Remover Peeling ES-WE20, listed on Amazon website on Jan. 5, 2014 at (http://www.amazon.com/Panasonic-Keratin-Remover-Peeling-ES-WE20/dp/B003AM7C8S/ref=sr_1_15?)ie=UTF8&qid=1420469797&sr=8-15&keywords=panasonic+ES-WE20), believedavailable on Amazon in Japan in Mar. 2010.
International Search Report for PCT/GB2014/050304 dated Jun. 6, 2014.
Amopé Pedi Perfect Electronic Pedicure Foot File, listed on Amazon website on Feb. 17, 2015 at (http://www.amazon.com/Amop%C3%A9-Pedi-Perfect-Electronic-Pedicure/dp/B00LE99PA2/ref=sr_1_1?ie=UTF8&qid=1422882188&sr=8-1&keywords=amope), believed available on Amazon in Jul. 2014.

* cited by examiner

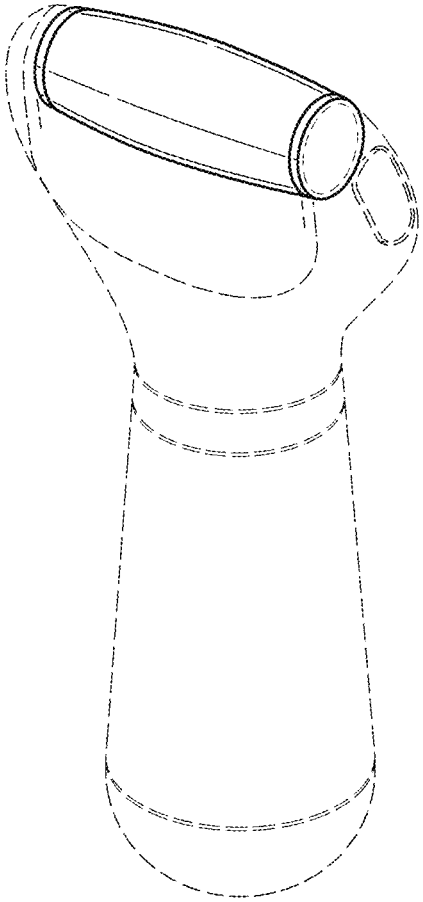
Fig. 8
(NEW)

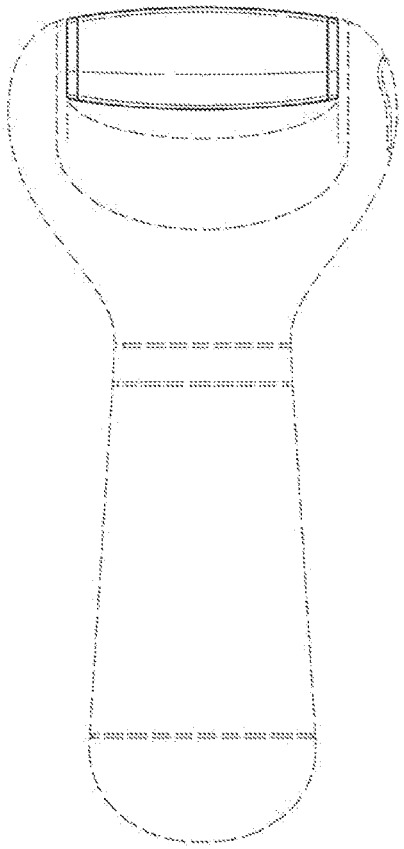
Fig. 9
(NEW)
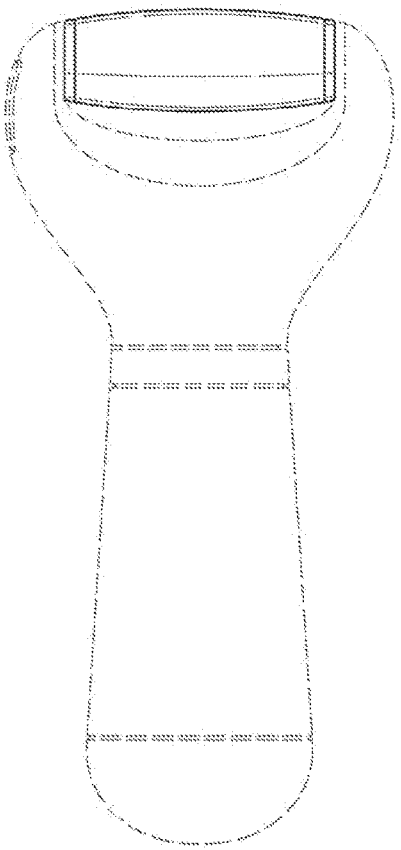
Fig. 10
(NEW)

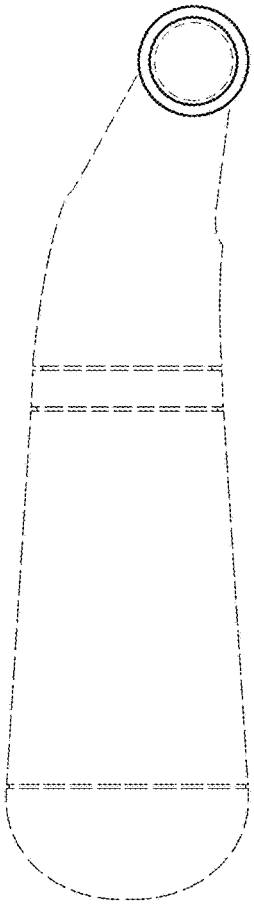
Fig. 11
(NEW)
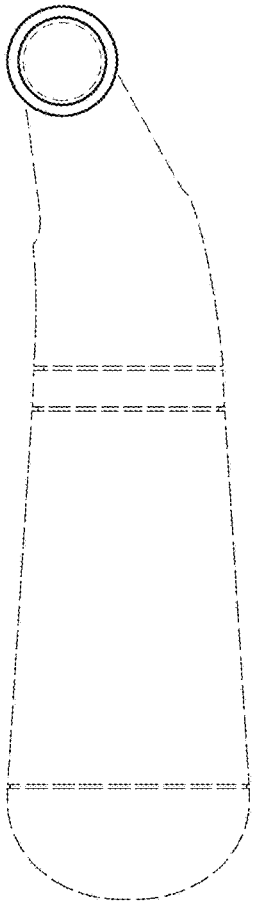
Fig. 12
(NEW)
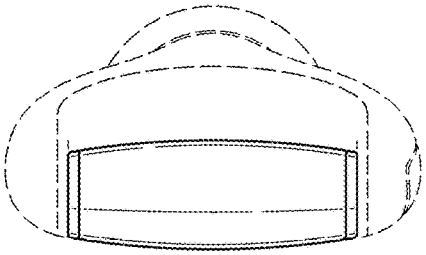
Fig. 13
(NEW)
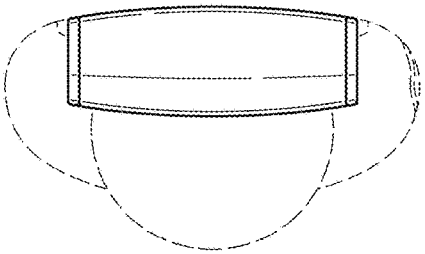
Fig. 14
(NEW)